H. E. KUHNER, DEC'D.
R. L. KUHNER, EXECUTRIX.
TESTING MACHINE.
APPLICATION FILED JULY 15, 1913.
1,107,619.
Patented Aug. 18, 1914.
2 SHEETS—SHEET 2.
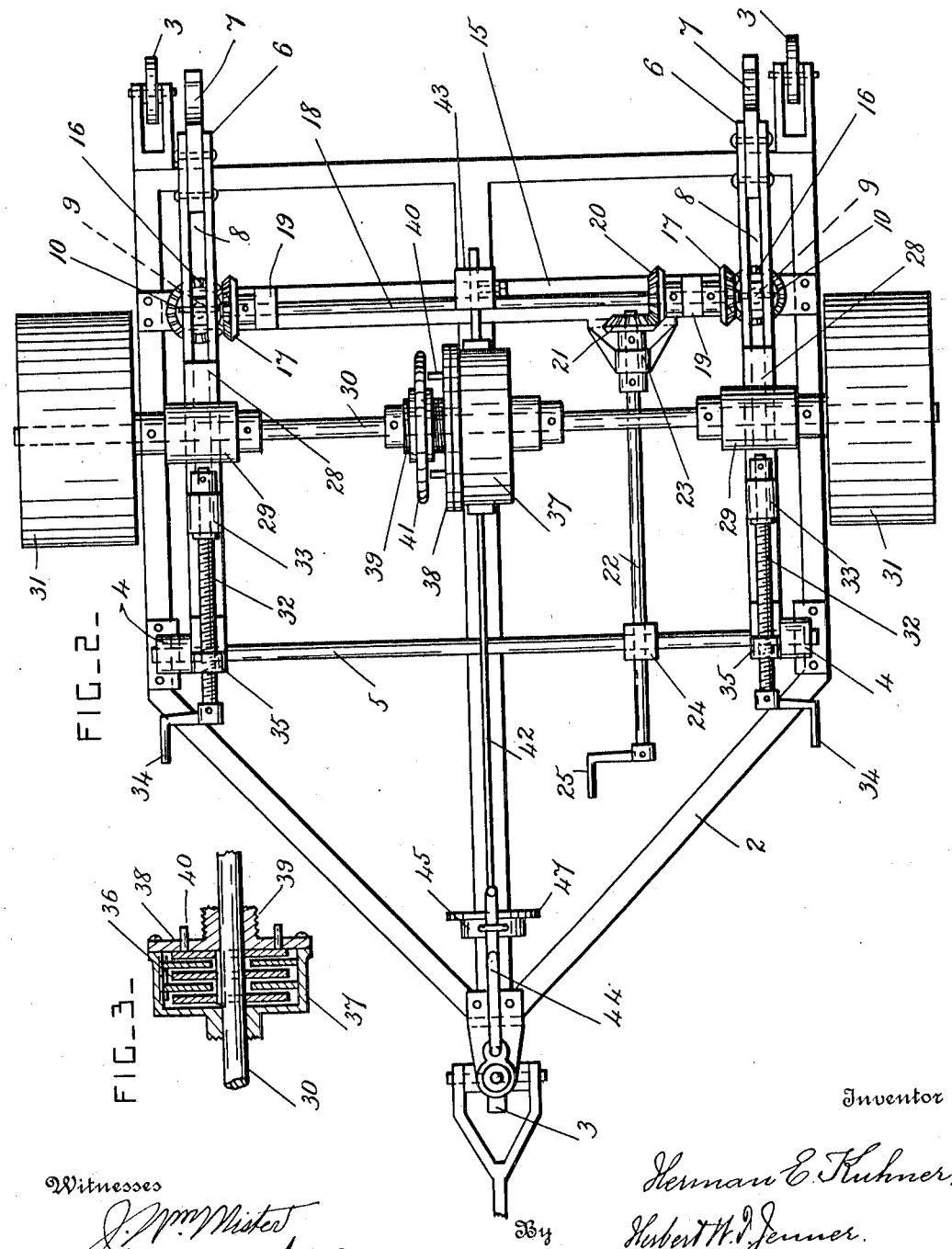
Witnesses
Inventor
Herman E. Kuhner.
By Herbert W. Jenner.
Attorney

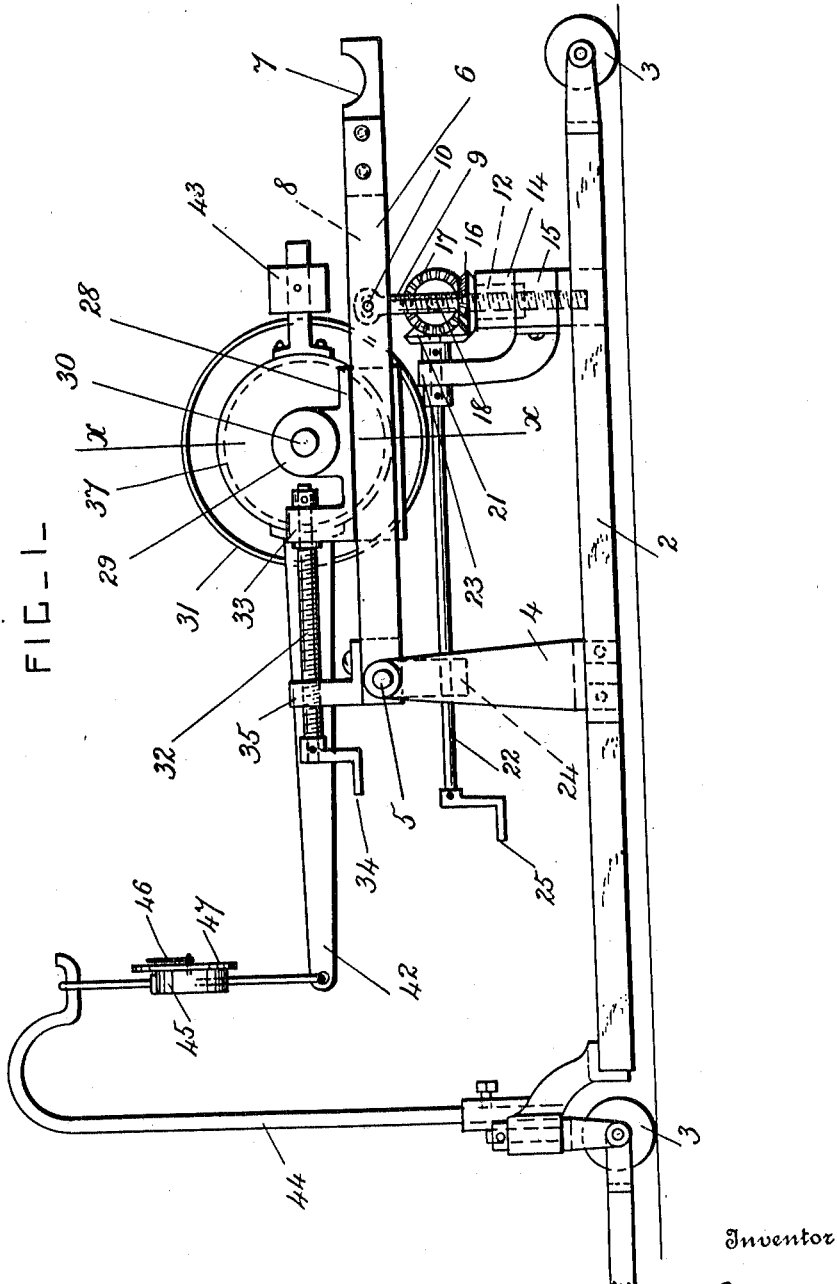

UNITED STATES PATENT OFFICE.

HERMAN E. KUHNER, OF OXFORD, MARYLAND; ROSE L. KUHNER EXECUTRIX OF SAID HERMAN E. KUHNER, DECEASED.

TESTING-MACHINE.

1,107,619.

Specification of Letters Patent. Patented Aug. 18, 1914.

Application filed July 15, 1913. Serial No. 779,184.

*To all whom it may concern:*

Be it known that I, HERMAN E. KUHNER, a citizen of the United States, residing at Oxford, in the county of Talbot and State of Maryland, have invented certain new and useful Improvements in Testing-Machines; and I do hereby declare the following to be a full, clear, and exact description of the invention, such as will enable others skilled in the art to which it appertains to make and use the same.

This invention relates to machines for testing motor cars; and it consists in the novel construction and combination of the parts hereinafter fully described and claimed whereby the working of the motor and its transmission gearing can be tested while the motor car is stationary and its engine is running under a load approximating to the load of running the car on a road.

This machine is specially useful for testing a motor in a garage, after it has been repaired, to ascertain for certain that all defects have been remedied. It is also used to teach a new car owner or driver the working of a motor car with the engine running, before taking the car on the road, so that he becomes familiar with the various levers and valves, and only has to learn the use of the steering devices subsequently when on the road.

In the drawings, Figure 1 is a side view of a testing machine constructed according to this invention with one of the driving pulleys removed. Fig. 2 is a plan view of the testing machine. Fig. 3 is a cross-section through the brake taken on the line $x-x$ in Fig. 1.

The testing machine is mounted on a frame or truck 2 having ground wheels 3 so that it can be moved about on the floor of a garage or workshop with facility. The frame 2 is provided with two uprights 4 at its middle part, and a shaft 5 is secured in these uprights and extends across the machine at a convenient height above the ground or floor. Two arms 6 have their rear end portions pivoted on the shaft 5, and have bearings or recesses 7 in the upper sides of their front end portions for engaging with the rear axle or any other convenient part of a motor car.

Lifting devices are provided for raising the arms simultaneously so as to support the motor car with its driving road wheels clear of the ground or floor. The arms 6 are each preferably formed of a pair of bars secured parallel to each other and forming a longitudinal guide slot 8. Lifting screws 9 are connected to the middle parts of the arms 6 by pivot pins 10, and the pin holes in the arms are elongated so as to permit the screws to move vertically.

The lifting screws engage with nuts 12 which are journaled in bearings 14, and the bearings 14 are supported by a crossbar 15 secured to the front end portion of the truck or frame. Each nut 12 has a beveled toothed wheel 16 secured to it, and each wheel 16 is arranged in gear with a beveled toothed wheel 17. The two wheels 17 are secured upon a cross-shaft 18 which is journaled in bearings 19 on the crossbar 15, and the wheels are arranged so that both arms are raised when the shaft 18 is revolved in one direction. When the wheels 17 are arranged as shown the lifting screws 9 have right and left hand screw threads respectively. The shaft 18 has a beveled toothed wheel 20 secured on it which gears into a beveled toothed wheel 21 secured on a longitudinal shaft 22.

The shaft 22 is journaled in a bearing 23 secured to the crossbar 15, and in a bearing 24 secured to the shaft 5, and the shaft 22 is provided at its rear end with a handle 25 for revolving it. Slides 28 are provided and are arranged to move longitudinally in the guides or guide slots 8 of the arms 6, and a brake shaft 30 is journaled in bearings 29 carried by the slides 28. The bearings 29 are preferably roller bearings.

Friction driving pulleys or wheels 31 are secured on the end portions of the brake shaft 30, and are arranged to bear against the driving road wheels of a motor car when its axle is supported by the arms 6. The pulleys 31 may have their peripheries corrugated or roughened, if desired, to prevent slip. Each slide 28 has a feed screw 32 journaled in a bearing 33 at its rear part. Each feed screw is provided at its rear part with a handle 34 or other approved means for revolving it, and it engages with a screw-threaded nut or bracket 35 secured to the rear end portion of the arm 6 pertaining to it. The screws 32 adjust the positions of the driving pulleys, and press them into driving engagement with the driving road wheels of the motor car.

A brake 36 of approved construction is arranged on the middle part of the shaft 30, and is inclosed in a casing 37. This brake preferably consists of a series of disks splined to the shaft 30, and a second series of alternating disks splined to the casing 37. The casing has a cover plate 38 on one side and a hub 39 which is screwthreaded. Pins 40 are slidable in holes in the plate 38, and a handwheel 41 is screwed on the hub 39 and bears against the projecting end of the pins 40. When the hand wheel is revolved to force the pins inwardly of the casing, the disks are pressed into frictional engagement with each other, and the frictional resistance is varied at will by the handwheel.

A brake lever 42 projects rearwardly from the casing 37, and a weight 43 is provided at the front part of the casing, and is adjusted so as to balance the brake lever. A support 44 is secured to the truck or frame, and a testing-scale 45 is suspended from the support 44 and is connected to the rear end of the brake lever. This testing-scale has a pointer 46 and a dial 47, and it is preferably a spring scale or balance of any approved construction. The testing-scale indicates the load on the engine of the motor car when the brake hand-wheel is screwed up to apply the brake, and the driving pulleys 31 are being revolved by the road wheels of the motor car.

The testing-scale can be arranged to indicate the brake horsepower of the motor, but this is of less importance than the opportunity afforded by the machine to test the running mechanism and motor of the car under load and before letting the motor car go out on the road. The wheeled truck is run upon the floor of the garage, so that the bearings 7 come under the axle of the motor car to be tested. The axle is then raised by the pivoted arms, and the driving pulleys 31 are slid forward into engagement with the car wheels. The weight of the car on the recessed bearings 7 prevents the wheeled truck from moving while the motor car is being tested.

What I claim is:

1. In a testing machine, the combination, with a supporting frame, of arms pivoted to the frame and adapted to support a motor car, lifting mechanism for raising and lowering the said arms, slides on the said arms, a shaft carried by the said slides, driving pulleys on the said shaft, means for pressing the driving pulleys against the driving wheels of the motor car, and brake mechanism for controlling the speed of the said driving pulleys.

2. In a testing machine, the combination, with a wheeled truck, of arms pivoted at one end to the truck and having recessed bearings on the upper sides of their free end portions for engaging with a motor car, lifting mechanism for raising and lowering the said arms, slides on the said arms, a shaft carried by the said slides, driving pulleys on the said shaft, means for pressing the driving pulleys against the driving wheels of the motor car, and brake mechanism for controlling the speed of the said driving pulleys.

3. In a testing machine, the combination, with a supporting frame, of arms having their rear ends pivoted to the frame and provided at their front end portions with bearings for supporting a motor car, lifting screws pivoted to the middle parts of the said arms, nuts journaled in the frame and engaging with the lifting screws, driving mechanism for revolving the nuts simultaneously to raise and lower the arms, slides on the said arms, a shaft carried by the said slides, driving pulleys on the said shaft, means for pressing the driving pulleys against the driving wheels of the motor car, and brake mechanism for controlling the speed of the said driving pulleys.

4. In a testing machine, the combination, with a supporting frame, of arms pivoted to the frame and adapted to support a motor car, lifting mechanism for raising and lowering the said arms, slides on the said arms, a shaft carried by the said slides, driving pulleys on the said shaft, screwthreaded brackets secured to the said arms, revoluble adjusting screws working in the said brackets and arranged parallel to the said arms and in operative connection with the slides, and brake mechanism for controlling the speed of the said driving pulleys.

5. In a testing machine, the combination, with a supporting frame, of arms pivoted to the frame and adapted to support a motor car, lifting mechanism for raising and lowering the said arms, slides on the said arms, a shaft carried by the said slides, driving pulleys on the said shaft, means for pressing the driving pulleys against the driving wheels of the motor car, a brake casing mounted loosely on the said shaft and provided with a screwthreaded hub, a friction brake arranged in the casing, pins slidable in the casing and adapted to apply the brake, a hand-wheel screwed on the said hub and bearing against the said pins, a brake lever secured to the said casing, and a testing-scale supported from the said frame and connected to the brake lever.

6. In a testing machine, the combination, with a support for holding a motor car with its driving ground wheels free of the weight of the car, of friction contact devices, means for pressing the contact devices against the said ground wheels to afford a predetermined resistance to their revolution, and brake mechanism for adjusting the resistance of the contact devices independently of their pressure against the said ground wheels.

7. In a testing machine, the combination, with a support for holding a motor car with its driving ground wheels free of the weight of the car, of friction contact wheels, adjustable pressing mechanism for holding the contact wheels in engagement with the said ground wheels, and a rake mechanism for controlling the speed and resistance of the contact wheels independently of the pressing mechanism.

In testimony whereof I have affixed my signature in the presence of two witnesses.

HERMAN E. KUHNER.

Witnesses:
J. H. Lewis,
Franklin Clarke.